H. V. HOLLINGS.
TRUCK TIRE.
APPLICATION FILED APR. 15, 1913.
1,106,812.
Patented Aug. 11, 1914.
2 SHEETS—SHEET 1.
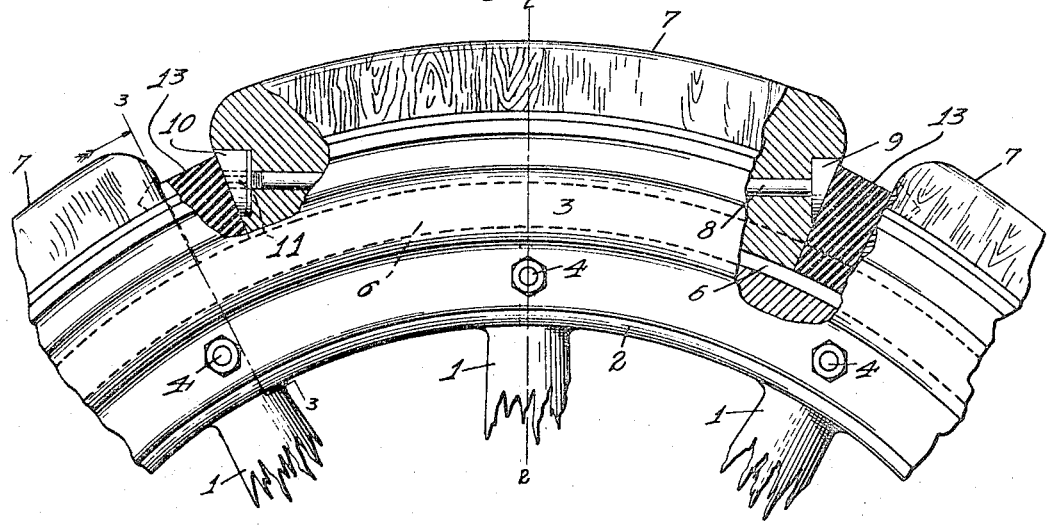
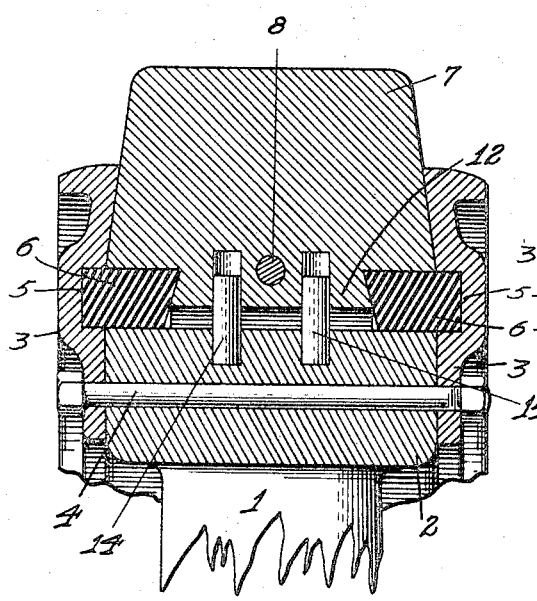
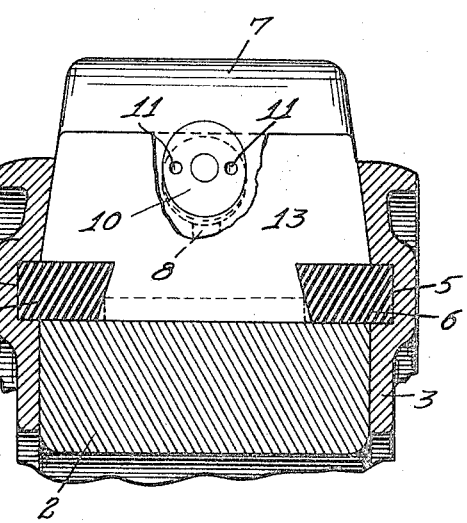
WITNESSES:
F. A. Simney.
A. H. Kephart.
INVENTOR.
HARRY V. HOLLINGS.
BY
Carlos P. Griffin
ATTORNEY.

H. V. HOLLINGS.
TRUCK TIRE.
APPLICATION FILED APR. 15, 1913.
1,106,812.
Patented Aug. 11, 1914.
2 SHEETS—SHEET 2.
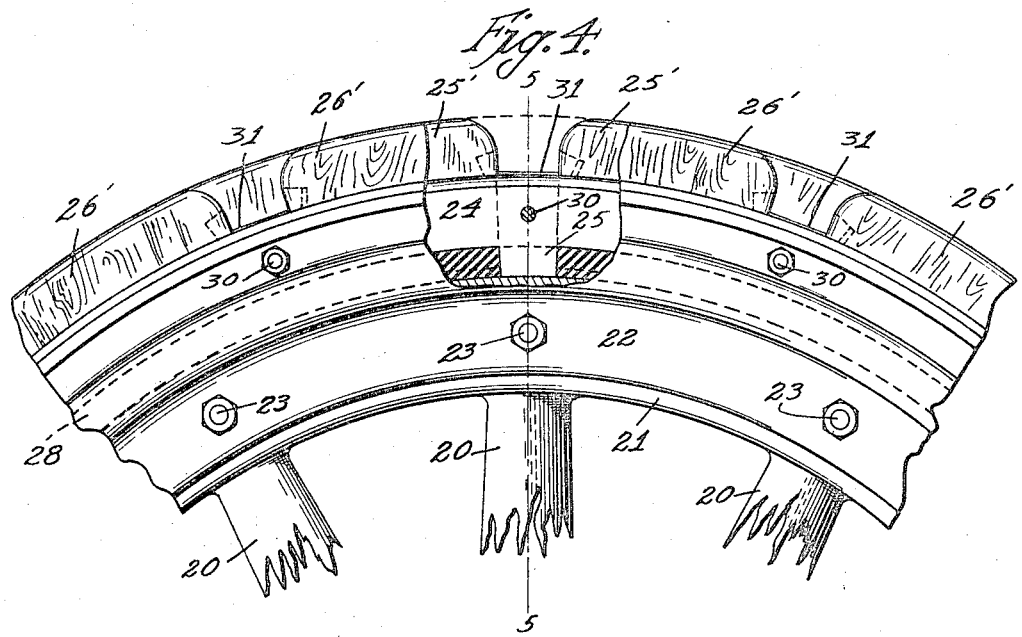
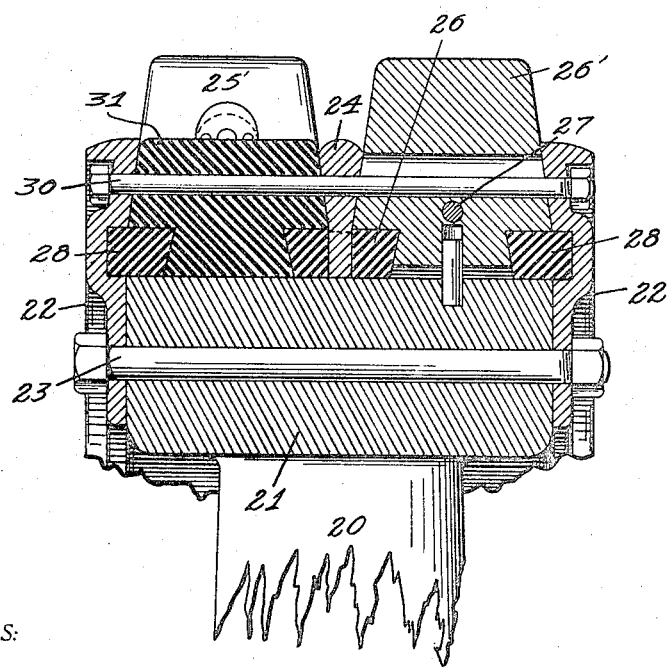
WITNESSES:
INVENTOR.
HARRY V. HOLLINGS.
BY
Carlos P. Griffin
ATTORNEY.

UNITED STATES PATENT OFFICE.

HARRY V. HOLLINGS, OF SAN FRANCISCO, CALIFORNIA, ASSIGNOR OF ONE-HALF TO CHRISTIAN T. JACOBSEN, OF SAN FRANCISCO, CALIFORNIA.

TRUCK-TIRE.

1,106,812.  Specification of Letters Patent.  Patented Aug. 11, 1914.

Application filed April 15, 1913. Serial No. 761,312.

*To all whom it may concern:*

Be it known that I, HARRY V. HOLLINGS, a citizen of the United States, residing at San Francisco, in the county of San Francisco and State of California, have invented a new and useful Truck-Tire, of which the following is a specification in such full and clear terms as will enable those skilled in the art to construct and use the same.
This invention relates to a resilient wheel for trucks and its object is to produce a very heavy and strong wheel capable of resisting great wear, while at the same time making use of materials which are comparatively cheap as compared with the ordinary rubber block truck wheel.

Another object of the invention is to support the block resiliently on all sides when under a load, thus giving a better spring effect than when the block is rigidly supported in part.

Another object of the invention is to produce a resilient tire for wheels which will have as small a quantity of the expensive materials as possible, thus reducing the cost of the tire.

Another object of the invention is to provide a resilient support for the wooden blocks used, which support is so positioned and formed as to never be compressed beyond its elastic limit, the blocks reaching the solid part of the wheel after a certain amount of compression of the rubber rings.

I am aware that there are many modifications of this invention, but one of the embodiments thereof is shown in the drawings in which the same reference numeral is applied to the same portion throughout.

Figure 1 is a side elevation of a portion of a wheel having the tire blocks therein constructed in accordance with this invention. Fig. 2 is a transverse sectional view through the block, rim and felly on the line 2—2 Fig. 1, Fig. 3 is a sectional view through the felly on the line 3—3 looking in the direction of the arrow Fig. 1, Fig. 4 is a side elevation of a portion of a wheel having two rows of blocks to give greater bearing for very heavy wheels, and Fig. 5 is a section on the line 5—5 Fig. 4.

The numeral 1 is applied to the spokes of a wheel, of which there may be such a number as is deemed requisite, and 2 indicates the felly. This felly has side rims 3 suitably secured thereto by means of bolts 4, said bolts passing through each of said rims. Each of these rims has a channel formed therein at 5 to receive rubber rings 6, which rings extend entirely around the felly and support wooden blocks 7.

The wooden blocks 7 are set so that the grain of the wood extends radially with respect to the wheel and each has a bolt 8 extending therethrough, said bolt having a head 9 and a tightening nut 10, which nut is provided with two holes 11 for tightening it in place. It will be seen that each of the blocks of which there may be any suitable number has a portion 12 dovetailed in between the two rubber rings seated on the felly. This block is spaced away from the felly by the amount it is desired to permit said block to move and between each pair of blocks there is inserted a rubber block 13. In order to prevent the blocks from creeping, such a number of them as is deemed necessary have openings therein, into which pins 14 project, said pins preventing the creeping of the blocks around the wheel.

In operation it will be observed that the blocks will move away from the side flanges a small amount and when so moved away from the flanges they will be entirely supported upon the adjacent rubber blocks and rings, thus giving the greatest resilient effect for a given movement thereof.

In Fig. 4 there is illustrated a slightly modified form of the tire in which similar wooden blocks set with the grain on the edge are used, with, however, two series of blocks to make up the complete tread. In this figure, the numeral 20 is applied to the spokes, 21 indicates the felly and 22 the side rims, which rims are held to the felly by means of the bolts 23. Each of these rims is substantially the same as the rim shown in the first form of the invention, but between the two rims there is a ring 24, said ring having portions 25 which extend into contact with the felly and between which extend blocks of rubber 26, said blocks forming the support for the inner sides of the two sets of wooden blocks 25' and 26'. These wooden blocks are prevented from splitting by means of bolts 27 similar to the bolts used in the other form of the invention, and they are supported upon their outer edges by means of rubber rings 28, said rings extending entirely around the felly. In order to give the side rims greater rigidity they are connected by means of a bolt 30 which extends through each of them through a slot in one of the blocks and through the adjacent rubber block 31. The bolts 30 may be used between the blocks as often as is deemed necessary to give the flanges additional strength.

An important feature of this invention lies in the provision of means whereby the rubber rings used will never be compressed beyond their elastic limit, the base of the block touching the solid wheel rim when the rubber rings have been compressed a given amount. The importance of this is seen where solid blocks are used on continuous rubber rings and the truck is permitted to stand for a long time bearing on one block. This produces a flat place in the rubber ring used and kills the life of the rubber, thus reducing the efficiency of the wheel in preventing shocks to the vehicle.

Having thus described my invention what I claim as new and desire to secure by Letters Patent of the United States, is as follows, modifications within the scope of the claims being expressly reserved:

1. A resilient tire for trucks comprising a felly, grooved side flanges bolted thereto and having portions of their adjacent faces approaching each other as they recede from the felly, solid blocks in contact with said approaching faces of the flanges, said blocks having a bottom portion adapted to contact with a solid portion of the wheel rim, and two rubber rings forming resilient cushions under the solid blocks, substantially as described.

2. A resilient tire for trucks comprising a felly, grooved side flanges secured thereto, portions of the adjacent faces of said flanges inclining toward each other as the flanges recede from the felly, solid blocks in contact with said approaching faces of said flanges, said blocks having a bottom portion adapted to contact with a rigid portion of the felly, two rubber rings forming resilient cushions extending into the grooves of the side flanges and supporting the solid blocks at the edges thereof, and resilient blocks between each pair of solid blocks, substantially as described.

3. A resilient tire for trucks comprising a felly, side flanges bolted thereto, said side flanges having their adjacent faces approaching each other as they recede from the felly, a central spacing ring surrounding the felly and having its opposite faces receding from each other, two series of solid blocks in contact with the flanges and spacing rings, said blocks having a portion to contact with the solid rim of the felly, and resilient rings upon which the edges of the base of said solid blocks rest, substantially as described.

In testimony whereof I have hereunto set my hand this 8th day of April A. D. 1913, in the presence of the two subscribed witnesses.

HARRY V. HOLLINGS.

Witnesses:
C. P. GRIFFIN,
G. SCHULTES.